Feb. 23, 1960 A. G. CHYNOWETH 2,926,336
FERROELECTRIC DEVICE
Filed April 14, 1955 4 Sheets-Sheet 1
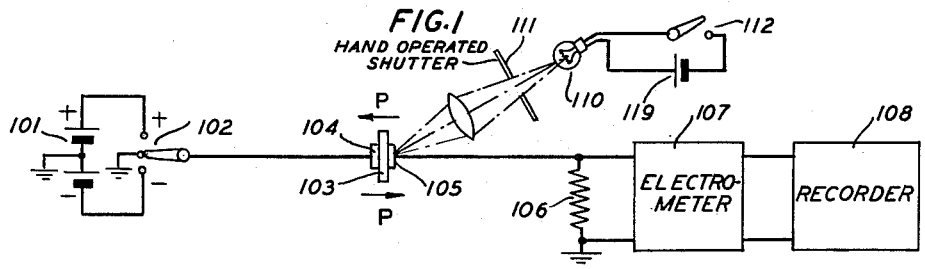
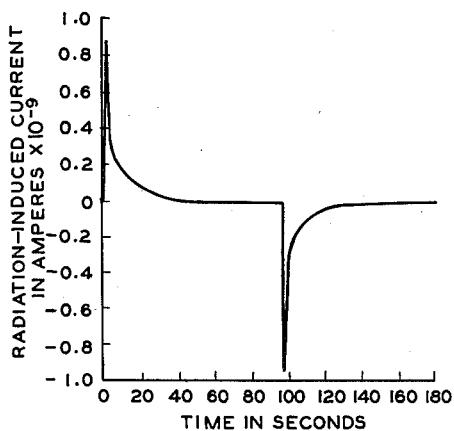
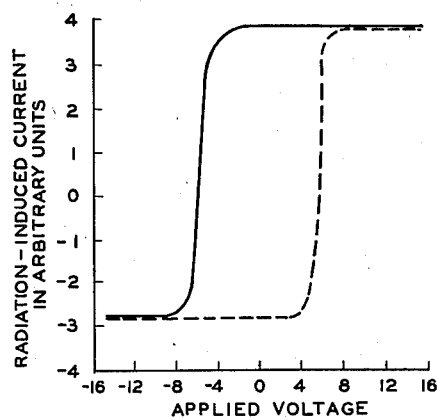
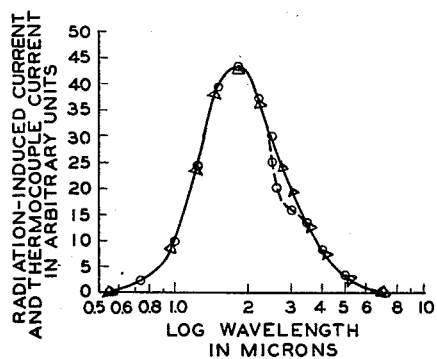
O RADIATION-INDUCED CURRENT.
△ THERMOCOUPLE CURRENT
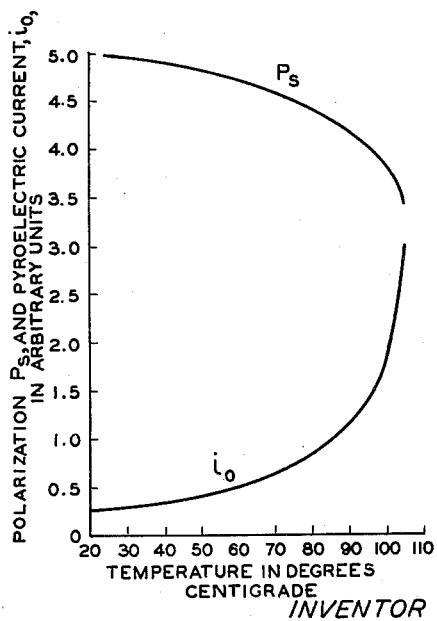
INVENTOR
A. G. CHYNOWETH
BY
*H. O. Wright*
ATTORNEY Feb. 23, 1960   A. G. CHYNOWETH   2,926,336
FERROELECTRIC DEVICE
Filed April 14, 1955   4 Sheets-Sheet 3
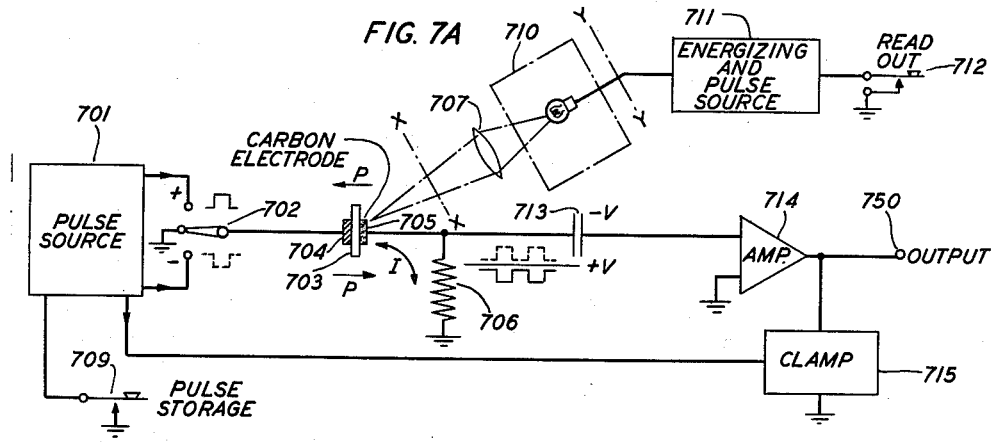
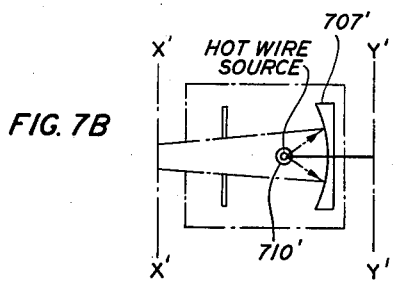
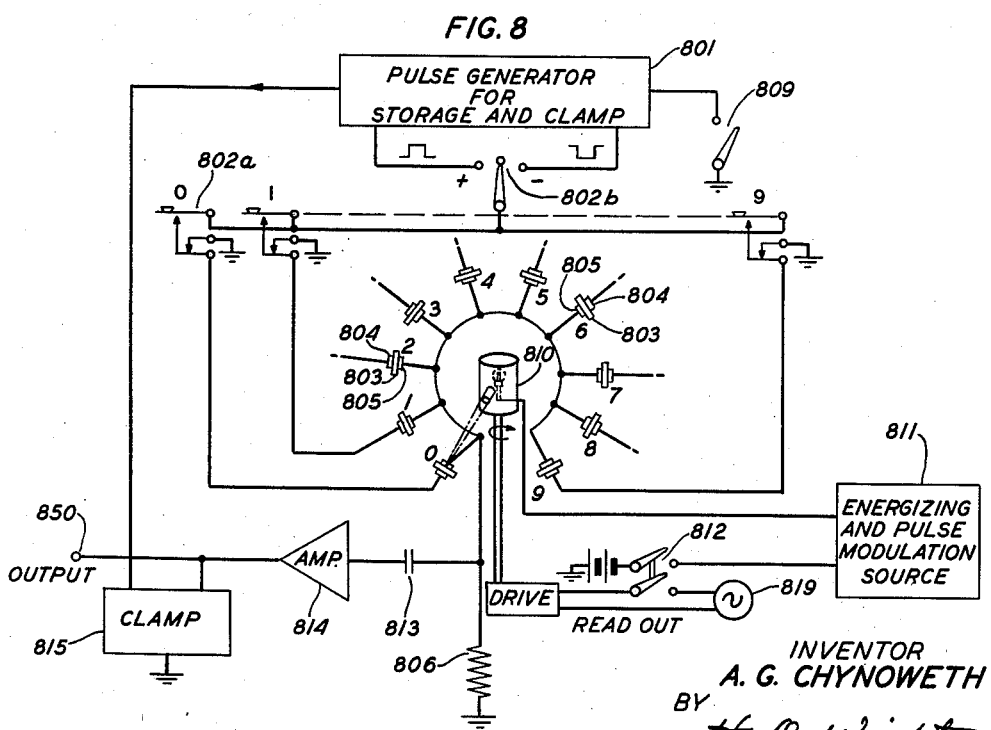
INVENTOR
A. G. CHYNOWETH
BY H. O. Wright
ATTORNEY

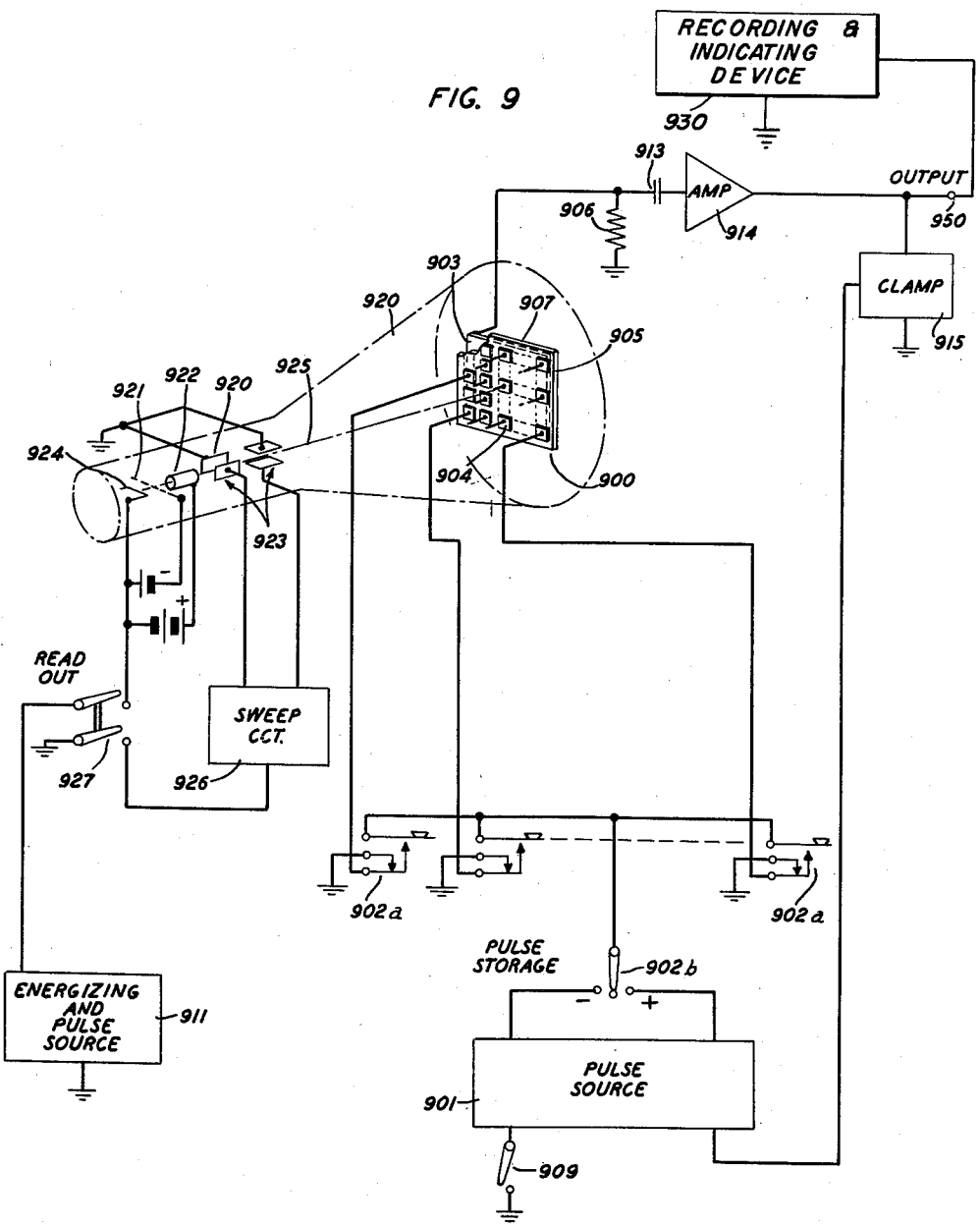

United States Patent Office

2,926,336
Patented Feb. 23, 1960

2,926,336

FERROELECTRIC DEVICE

Alan G. Chynoweth, New Providence, N.J., assignor to Bell Telephone Laboratories, Incorporated, New York, N.Y., a corporation of New York Application April 14, 1955, Serial No. 501,413

14 Claims. (Cl. 340—173)

This invention relates in general to electrical transducers including ferroelectric crystals as their active elements.

The term "ferroelectric" is applied to those crystalline materials which exhibit a relationship between the electrostatic polarizing force and the resultant polarization in the direction of the applied force which is analogous to the hysteresis loops exhibited by magnetic materials. At the present time, probably the best known and most widely used ferroelectric material is barium titanate. In recent years, the unique charge-storing properties of ferroelectrics, including barium titanate, have been utilized in numerous switching, computing, and signal recording-reproducing operations.

In most of the operations, two steps are involved. The signal is first stored in the ferroelectric element in the form of a charge or polarization pattern. Subsequently, the stored signal is read out by electrically detecting the stored charge or polarization pattern. In accordance with known prior art practices for reading-out signals stored in simple ferroelectric storage elements, the electrical potential or exploratory pulse which is applied to the ferroelectric storage element for read-out purposes, destroys the stored signal during the interrogation process, permitting each recorded signal to the read out only once.

Moreover, a further problem is encountered when utilizing certain types of prior art ferroelectric devices, in that the reading-out process is carried out too slowly to be practicable.

Accordingly, it is the principal object of this invention to improve construction and operation of ferroelectric circuit elements, more particularly as to the reading-out process, or the detection of their states of polarization.

A more specific object of the invention is to provide means for non-destructively reading out the record stored in a simple ferroelectric circuit element.

A further object of the invention is to provide means for reading out or detecting the polarization patterns of ferroelectric storage devices more rapidly, and with less complicated circuitry than heretofore possible.

These and other objects are realized in a novel arrangement for utilizing a beam of electromagnetic radiation of suitable wavelengths to detect the state of polarization of a charged ferroelectric element. In accordance with the present invention a beam of radiation, which in certain of the disclosed embodiments is light having a high infra-red component, is flashed on a polarized ferroelectric element, thereby generating a pyroelectric current in the element which varies in sign in accordance with the direction of the polarization of the latter. In accordance with a particular embodiment of the invention, a ferroelectric crystal element which may comprise, for example, a thin single crystal of barium titanate with its "c" or optic axis in the thickness direction, is mounted between a pair of electrodes plated to its major surfaces. A "storage" signal is applied across the electrodes, of sufficient strength to saturate the polarization of the crystal, thus orienting a maximum number of its domains in the "c" direction. Upon removal of the polarizing voltage, a large proportion of the domains remain oriented in the "c" direction, producing a "remanent polarization" which is retained indefinitely, and is a record of the sign of the impressed signal.

In order to read out or determine the direction of polarization of the signal stored in the element, in accordance with the present invention a beam of radiation is flashed on the crystal generating a small pulse of "pyroelectric current" therein. The duration of the flash may be anywhere between a few microsecond and a tenth of a second according to convenience. The pyroelectric current produces a potential across a series resistor in the output circuit whose direction bears an inverse relationship to the polarity of the pulse initially stored. In certain of the disclosed embodiments, a beam of infrared radiation is used, or light having a high infra-red component, while in another embodiment, an electron beam is used. Moreover, it will be apparent that the technique described above can be readily applied to reading out the polarization pattern stored on individual units of an ordered array of storage elements. One such array comprises a series of elements arranged either on one plane or on a cylindrical surface, the array being scanned by a mechanically rotated beam of light or infra-red radiation. In accordance with a more complex embodiment, a two dimensional matrix of ferroelectric elements polarized in a preselected pattern is scanned by a highly concentrated high-voltage electron beam, focused successively on the individual elements thereof. The contacting of the beam with the elements serves to generate pyroelectric currents in the polarized elements in a manner similar to the light and infra-red beams described in the foregoing paragraphs.

A particular feature of the present invention is that the pyroelectric reading-out process does not destroy the recorded signal, which may be read out over and over again, until a change in the stored pattern is desired. A further advantage of the arrangements described, is the speed with which a "read-out" beam may be moved from one point to another on an array of storage elements without the requirement for complicated switching circuitry.

It will also be apparent that with slight modification, a polarized ferroelectric cell of the type described in the foregoing paragraphs will serve as a sensitive device for detecting and measuring the intensity of infra-red radiation, and for measuring rapid changes in temperature.

These, and other objects, features, and advantages of the invention will be apparent from the detailed study of specification hereinafter, with reference to the attached drawings, in which:

Fig. 1 shows an experimental circuit for demonstrating the principles of the present invention;

Fig. 2 shows the variation of radiation-induced current during a slow light-dark cycle using infra-red radiation focused on a polarized single crystal of barium titanate;

Fig. 3 shows a hysteresis curve in which radiation-induced current is plotted as a function of the voltage applied to the crystal;

Fig. 4 illustrates the correspondence between radiant energy incident on a ferroelectric element and the induced pyroelectric current throughout the spectrum of the irradiating beam;

Fig. 6 is a comparative showing of spontaneous polarization measured from a dielectric hysteresis loop, and pyroelectric current, both plotted as functions of temperature;

Fig. 7A shows in schematic diagram a single ferroelectric crystal unit in combination with a light beam for reading out stored information;

Fig. 7B shows a modification of the arrangement of Fig. 7A in which a beam of infra-red radiation from a hot-wire, substituted for the light source, is used for reading out stored information;

Fig. 8 shows a system in accordance with the present invention which utilizes a plurality of cells of the type described in Fig. 7A in concentric arrangement, and in which the stored information is read out by means of a mechanically-rotated scanning beam of radiation;

Fig. 9 shows another system in accordance with the present invention in which a two-dimensional matrix of ferroelectric storage elements is electronically scanned for read out purposes.

Figure 5:
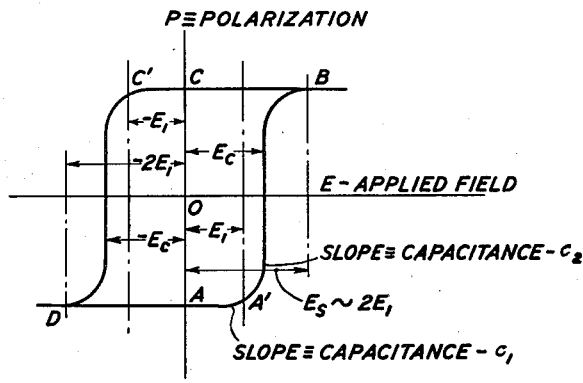
Fig. 5 shows an idealized hysteresis loop of a ferroelectric crystal, used to illustrate the principles of the present invention.

As has been pointed out in the foregoing pages, when polarized ferroelectric crystals are subjected to flashes of radiation, such as visible light and infra-red radiation, transient currents are produced which have a pyroelectric origin. The explanation for this effect is that the applied illumination results in a small change in the temperature of the crystal which causes a corresponding change in the spontaneous polarization. If the net polarization over the whole crystal is not zero, a current flows round the external circuit for as long as the polarization (and, therefore, the temperature) is changing.

This current is a maximum when the total polarization of the crystal is saturated.

It can be shown that from room temperature up to the Curie point of the subject ferroelectric crystal (barium titanate), the magnitude of the pyroelectric effect is defined by the spontaneous polarization as a function of temperature as determined from measurements of the dielectric hysteresis loop produced by cycling an applied electrical field of sufficient peak strength. It follows that a similar dependence of the pyroelectric current on the polarization as a function of temperature occurs for any ferroelectrical material. The relationship between the direction of the pyroelectric current and the direction of the polarization can be utilized in numerous circuit applications, several of these applications, including different types of ferroelectric storage devices. These will be described in detail hereinafter (together with a modification for use of the ferroelectric material as a detector for infra-red radiation), for the purpose of illustrating the invention.

The principles underlying the present invention can be most effectively explained by reference to several preliminary experiments carried out by means of a simple direct current series circuit arrangement such as indicated in Fig. 1 of the drawings.

Referring to Fig. 1, there is shown a voltage supply 101, having positive and negative taps from a mid-point ground connection, which taps may be alternatively connected by switch 102, to electrode 104 of the ferroelectric crystal 103. The latter consists of a single crystal of barium titanate, about 2 millimeters square and of the order of $2 \times 10^{-3}$ centimeters thick, which is oriented with its "c" or optic axis in the thickness direction. The crystal 103 may be prepared by any of the techniques well known in the art, such as disclosed, for example, in application Serial No. 344,373, filed March 24, 1953 by J. P. Remeika. Circular semi-transparent platinum electrodes 104 and 105, 1.5 millimeter in diameter were evaporated on opposite faces of the crystal 103, silver foil leads being affixed to the electrodes by means of minute supports of air-drying silver paste. Electrode 104 was connected to switch 102, and electrode 105 was connected to ground through a 100 megohm resistance element 106. Across the resistor 106 was connected a sensitive electrometer 107, suitable for measuring small amounts of current. To the output of this unit, was connected a paper strip recorder 108 which served to record the variation of the output current from the electrometer 107 with time, while the crystal was illuminated by the light source 110, or after illumination ceased. A tungsten projection lamp, filtered by a Corning glass filter 3387, was used as the light source 110. The light, energized by a conventional battery under control of switch 112, was optically focused on the crystal 103, and the beam was modulated by means of a hand-operated shutter 111. The effects investigated with the above-described apparatus were confined by the filter to those produced by wavelengths in excess of 4400 Angstroms, these being too long to be involved in side effects such as photo-conductivity.

Fig. 2 of the drawings shows a typical example of the way in which the radiation-induced pyroelectric current in the ferroelectric crystal 103 varies with time when the light source 110 is switched on, and then off. When the illumination is switched on, the current generated in crystal 103 rises abruptly to a high value, whereupon it decays smoothly over a period of several seconds to the value it previously had during the dark interval. When the light is switched off, the current rises abruptly to a value slightly higher than the first value, but opposite in direction. The current generated during the dark interval then decays to zero with about the same time constant as did the current induced during the light interval. This light-dark cycle can be repeated indefinitely.

The direction in which the generated current flows during the light interval is of significance. In general, it flows in a direction contrary to that of the electric field applied by the voltage supply 101. If the initial peak height of the current induced during the light interval is plotted as a function of the applied static polarizing field, a hysteresis loop results, of the form shown in Fig. 3. To a first approximation, the application of fields many times in excess of the field required to switch the crystal from one state of polarization to another, produces no further change in the magnitude of the current.

Further information about this radiation-induced excitation process may be obtained by comparing the current output of the ferroelectric crystal with that of a conventional thermocouple, well known to depend on the energy of the incident radiation only, when the crystal and the thermocouple are alternately irradiated by the same beam at each of a number of different wavelengths over the spectrum of the source. In one such experiment an infrared source was employed, characterized by a band spectrum extending over the wavelength range 0.6 micron to 8 microns, and having a peak for waves of 1.9 microns length. An infrared monochromator was interposed in the beam of radiation from this source. This instrument acts to select a particular desired, very narrow, subband of wavelengths, suppressing the others. As the pass band of the monochromator was swept over the spectrum of the source, the current output of the thermocouple varied in the manner shown by the curve of small triangles in Fig. 4. Because of the known response behavior of the thermocouple, this curve could be taken to represent the distribution of the energy of the infrared source as a function of wavelength.

The output current, i.e., the pyroelectric current induced in the crystal 103, which had first been completely polarized in one direction, is plotted independently in Fig. 4 as a curve of small circles. Evidently, it is almost fully coincident with the thermocouple current curve. From this it can be confidently inferred that, for any particular wavelength of the incident radiation, at least within the range 0.6 to 8 microns, the pyroelectric current induced in a ferroelectric crystal depends only on the energy of the incident radiation. The absence of any particular wavelength selectivity rules out excitation from discrete energy levels as the source of current carriers, and furthermore, implies that the current is generated by heating of the crystal.

From the foregoing, it is evident that the most significant value measured is that of $i_0$, the pyroelectric current, which is generated immediately when the light is switched on. To measure this current, it was more convenient to modulate the beam of radiation by means of a rotating chopper so that pulses of light of a few milliseconds duration were applied to the crystal. These pulses were short compared to the intervening dark intervals to avoid substantial changes in the steady state temperature of the crystal. The pulses of induced current were passed through a broad-band amplifier and displayed on an oscilloscope. It was found that the shape of the leading edge of the derived current pulse corresponded to that of the light pulse, even when the rise time of the light pulses was as short as 50 microseconds.

A better understanding of what occurs when a polarizing voltage is applied to a ferroelectric crystal will be obtained by reference to Fig. 5 of the drawings, which shows a hysteresis loop of a form which is considered ideal for ferroelectric storage elements. The hysteresis characteristic shown is closely approximated by single crystals of barium titanate, processed in the manner disclosed in J. P. Remeika, application Serial No. 344,373, referred to earlier in this specification, or by single crystals of guanidinium alluminum sulphate hexahydrate prepared in the manner described in application Serial No. 489,193, filed by B. T. Matthias, February 18, 1955.

In Fig. 5 the consequent polarization P of the crystal, is plotted against E, the strength of the applied field. Assume that the subject crystal has been previously polarized, a negative "remanent" polarization remaining after the removal of the polarizing field. This condition is indicated by point A on the curve, the distance OA being proportional to the magnitude of negatively-directed remanent polarization.

In order to reverse the direction of the polarization it is necessary to apply a positive field whose strength is somewhat greater than $E_c$, the coercive force. To completely polarize the crystal in the positive direction thus requires a field strength $E_s$, the saturation field. After applying this field, the condition of the crystal is represented by a point such as B in Fig. 5.

When the applied field is removed, a large part of the positive polarization is retained as "remanent polarization," being represented by the length of the line OC. The maximum possible "remanent" polarization to which a crystal is subject, assuming all of the electrical domains remain aligned in the same direction, is called the "spontaneous polarization."

It is apparent that if sufficient negative potential is applied to the positively polarized crystal, the remainder of the hysteresis curve can be traced through points C'DA. It will be noted that on the upper and lower portions of the ideal curve, represented by BCC' and DAA', respectively, the rate of change of polarization with respect to the applied field is very small, and is indicated by a small slope or capacitance $c_1$. The very rapid rate of change of polarization with applied field is indicated by the steep slopes of the side portions of the curve, A'B and C'D. They represent conditions of high capacitance, $c_2$.

Accordingly, assume that it is desired to store pulses in the crystal 103 of Fig. 1. In preferred form, this crystal will have a relatively low coercive force, a high spontaneous polarization, and an approximately rectangular form of hysteresis loop as characterized by a high ratio between the slopes of its steep and flat portions.

In order to store a positive pulse, the applied field, which will be represented by $+2E_1$, should preferably be sufficient to saturate the crystal in a positive direction, so that the crystal is initially polarized to point B, retaining a positive remanent polarization OC when the field is removed. It will be apparent that positive storage will not take place if the applied field is substantially less than $2E_1$. A similar relationship holds true for negative storage pulses.

The physical mechanisms relating to the pyro-electric effect in ferroelectric crystals may be summarized analytically as follows:

As the crystal temperature is increased towards the Curie point, $T_c$, the resulting thermal expansion of the crystal lattice causes the spontaneous polarization, $P_s$, to decrease gradually. Thus, at any temperature $T$ ($<T_c$), a small change in temperature $dT$ will produce a change $dP_s$ in the spontaneous polarization $P_s$. If this change is effected in time $dt$, the polarization changes for any given temperature at a rate of $(dP_s/dt)_T$ which will be recorded as an output current; this current, $i$, will be referred to as the "pyroelectric current." Thus, $$i = \left(\frac{dP_s}{dt}\right)_T = \left(\frac{dP_s}{dT}\right)_T \left(\frac{dT}{dt}\right) \quad (1)$$

For small changes in temperature $\Delta T$, the value of $(dP_s/dT)_T$ can be regarded as constant. The magnitude of the current then depends only on the rate of change of temperature, while its sign depends on the direction of polarization and whether the temperature change is an increase or decrease.

Since the current is proportional to $$\frac{dT}{dt}$$

it is finite from $t=0$, whereas in prior-art detectors for temperatures changes, the response follows the actual temperature. Thus, the pyroelectric effect makes possible detectors with an extremely rapid response; that is, with a rise time of as little as 1 microsecond.

From the foregoing, the interpretation of Fig. 2 of the drawings will be clear. When the illumination is commenced at $t=0$, the value of $$\frac{dT}{dt}$$

is at its maximum positive value and gradually approaches zero as the new equilibrium temperature is attained. When the light is cut off, the value of $$\frac{dT}{dt}$$

is initially at its maximum negative value and again approaches zero as the crystal cools to its original temperature and polarization. Thus, on completing the cycle, the light has acted non-destructively on the crystal, though it has given rise to a current that is indicative of the state of polarization of the crystal.

It is of interest to compare the variation of $P_s$, the spontaneous polarization, with temperature T, determined from pyroelectric measurements, with that determined in the usual way from measurements on the hysteresis loop.

At any temperature T, the rate of temperature rise of the crystal under illumination is given by the equation $$\left(\frac{dT}{dt}\right)_T = A\frac{H}{C_p} - f(\Delta T) \quad (2)$$

where A is a constant, H is the rate of heating due to the light (assumed to be constant), $C_p$ is the specific heat of the crystal at constant stress, and function $f(\Delta T)$ describes the heat losses of the crystal. At time $t=0$, $\Delta T=0$; and consequently, the value $$C_p \cdot \left(\frac{dT}{dt}\right)_T$$

is a constant at all temperatures for a given light intensity. Thus, referring back to Equation 1, it is seen that $$\frac{(dP_s)}{(dT)_T}$$

is proportional to the product $(i_0 \times C_p)$, where $i_0$ is the pyroelectric current generated at any temperature T at time $t=0$.

As the temperature of the crystal 103 in Fig. 1 was slowly raised in the range from 20° to slightly above 100° centigrade, repeated alternate readings were taken of the pyroelectric current, $i_0$, and the polarization current $P_s$. Before each reading of $i_0$, the crystal 103 was polarized with a static field of about 3000 volts per centimeter which was sufficient to produce saturation. The applied field was reduced to zero for the actual reading of $i_0$. The spontaneous polarization $P_s$ was measured at each of the successive temperature points from the height of the dielectric hysteresis loop. This loop was obtained by disconnecting the crystal from the pyroelectric current-measuring circuit and placing it in an alternating-current bridge. A 60 cycle voltage source applied to the bridge enabled the hysteresis loop to be displayed on an oscilloscope. The results are plotted in Fig. 6, values for $i_0$ and $P_s$ being expressed in arbitrary units. It is evident that $i_0$ varies in the manner to be expected from the variation of $P_s$ with temperature; that is, $i_0$ increases with the slope of the polarization-temperature curve.

Fig. 7A of the drawings shows a single ferro-electric storage unit arranged for reading out the stored signal information in accordance with the teachings of the present invention.

The active element of the unit comprises a ferroelectric crystal element 703, which may take the form of a single crystal of barium titanate, prepared and processed in the manner described with reference to the element 103 of Fig. 1, or alternatively, any other ferroelectric element having the requisite hysteresis characteristic, such as a single crystal of guanidinium aluminum sulphate hexahydrate prepared and processed in the manner described in detail in application Serial No. 489,193 filed February 18, 1955 by B. T. Matthias. The crystal element 703 is mounted between a pair of thin platinum electrodes 704 and 705, evaporated onto the major faces of the crystal having its $c$ or optic axis in the thickness direction, in the manner described with reference to the element 103 in Fig. 1. Alternatively, deposited carbon electrodes may be used instead of evaporated platinum. Carbon electrodes would minimize the loss of efficiency by reflection of the incident radiation.

The electrode 704 on one side is connected to the contacting arm of a three-way switch 702, one contact of which is connected to ground, and the other two contacts of which are connected to the positive and negative output terminals of a pulse source 701 which is activated by application of ground by switch 709. The later is adapted to provide substantially square-topped pulses of up to ±30 volts at its respective outlets, and may take any of the forms well known in the art, such as, for example, a conventional multivibrator. The output impedance should be low compared to resistor 706. The length of the pulses need be no more than necessary to complete the saturation of the polarization, usually of the order of 10 microseconds. An output circuit is connected to the ferroelectric element 703 through the electrode terminal 705. This output circuit comprises the $10^5$ ohm resistor 706, the lower end of which is connected to ground, and the 0.01 microfarad condenser 713, the right terminal of which is connected to the input terminal of a conventional amplifier circuit 714 of suitable bandwidth (1 megacycle). The clamp circuit 715, which is connected for triggering by the pulse source 701, serves to short-circuit the output current of amplifier 714 while storage pulses of either polarity are applied to the ferroelectric element 703. The clamp circuit 715 may assume any of the forms well known in the art, such as indicated, for example, on pages 114–117 of Electronics by Elmore and Sands, McGraw-Hill, 1949. Moreover, it will be apparent that numerous other well known circuit expedients can be used to block the output of amplifier 714.

The actual read-out mechanism for the ferroelectric element 703 comprises a source of light 710 which, preferably, has a high infra-red component. For example, light source 710 can be a tungsten projection lamp, the light output from which is passed through a Corning glass filter number 3387, designed to cut out all wavelengths shorter than about 4400 Angstroms. The beam from source 710 is focused on element 703 by means of lens 707, or any of the focusing devices well known in the art.

The following consideration will serve as criteria for calculating the optimum operating conditions for the lamp source 710 and the optimum dimensions of the ferroelectric element 703.

Suppose radiation of W watts strikes the crystal 703 normally, covering an area A; and assume that all the radiation is absorbed and converted to thermal energy in the crystal. Then from Equation 1 it is apparent that the pyroelectric current $i$ which will be induced in crystal 703 is given by $$i = A\left(\frac{dP_s}{dt}\right) = A\left(\frac{dP_s}{dT}\right)\left(\frac{dT}{dt}\right) \qquad (3)$$

Equating the power absorbed to the change in heat content of the crystal $$W = JAd\rho C_p\left(\frac{dT}{dt}\right) \qquad (4)$$

where J is the mechanical equivalent of heat, $d$ is the thickness of the crystal, $\rho$ is its density, and $C_p$ is its specific heat at constant stress. Thus, $$\frac{i}{W} = \left(\frac{dP_s}{dT}\right)_T \bigg/ d\rho C_p J \qquad (5)$$

The following typical figures for barium titanate can be substituted in (5):

Let $d = 10^{-2}$ cm., J=4.2 joules/calorie, $\rho = 6.0$ grm./cc., $C_p = 0.12$ cal./grm.° C. At 30° C.

$$\left(\frac{dP_s}{dT}\right)_T = 2 \times 10^{-8} \text{ coulomb/cm.}^2/°C.$$

and at 100° C., $$\left(\frac{dP_s}{dT}\right)_T = 2 \times 10^{-7} \text{ coulomb/cm.}^2/°C.$$

Thus $$\left(\frac{i}{W}\right) = 0.7 \times 10^{-6} \text{ amp./watt at 30° C.}$$

and is about 10 times greater at 100° C.

The following numerical example is given to indicate an operative arrangement for the read-out light source 710.

A 300 watt tungsten projection lamp is used in combination with an F 3.5 focusing lens 707, the source 710 being located at the distance of about one foot from the surface of the crystal 703. The energizing circuit of the lamp 710 is connected to a pulse source 711 under control of switch 712, the former serving to modulate the light output from the source 710 with pulses having any convenient length, say, within the range $10^{-1}$ to $10^{-6}$ seconds. The intervals of separation are not critical, but are preferably somewhat greater than the pulse lengths, to prevent undue heating of the crystal. There are many methods well known in the art for pulsing the output of source 710. For example, mechanical light choppers may be used, as well as electrical and optical systems, such as, for example, an interposed Kerr cell. It will be apparent also that source 710 can take numerous other forms well known in the art.

The light source 710 can be replaced by a hot wire heater unit comprising, for example, a high resistance silicon carbide filament of the type known commercially as a "glow-bar," obtainable from the Norton Company in Worchester, Massachusetts. As indicated in Fig. 7B in the drawings, such a unit, together with appropriate means for focusing the beam, which may comprise a concave, metallic mirror 707' can be substituted for the section between the dotted lines XX and YY in Fig. 7A.

The circuit of Fig. 7A operates as follows:

The crystal element 703 is polarized either positively or negatively, as desired, by connecting the blade of the switch 702 to the terminal of desired output polarity of the pulse source 701, and closing key 209. Simultaneously, the clamping circuit 715 operates to short-circuit the output from the amplifier 714, so that no storage pulses appear in the output. Upon completion of this step, which stores a pulse of desired polarity in the crystal unit 703, the blade of switch 702 is positioned on the ground terminal; and the pulse storage switch 709 is opened. For reading out at any subsequent time, switch 712 is connected to ground. This energizes the light source 710, together with the pulse modulating circuit thereof 711, whereby flashes of light are focused on the ferroelectric element 703. Corresponding pyroelectric output currents create potential drops across the resistance element 706. The polarity of the potential pulses transmitted through condenser 713 to amplifier 714 is the opposite to that of the storage pulse applied to the element 703. These output voltage pulses, after amplification, appear at the output terminal 750.

It will be apparent that the technique of reading-out the impressed polarizations on ferroelectric crystal elements which is indicated with reference to the circuit shown in Fig. 7A of the drawings, can be adapted to numerous different types of multi-element storage systems, and is particularly suited for beam-type scanning. Such a system, utilizing beam-type scanning for read-out, is indicated in Fig. 8 of the drawings. As shown, a plurality of ferroelectric crystals elements, each of the type indicated with reference to the elements 703 of Fig. 7A and 103 of Fig. 1, are arranged in a circle about a central mechanically rotatable light scanning source 810. Each of the units 803 is mounted in the manner previously described between a pair of evaporated electrodes 804 and 805. Each of electrodes 804 is connected to a respective one of a bank of switches 802a, which, in turn, are commonly connected to the blade of another switch 802b. Switch 802b can alternatively make contact with either the positive or the negative pulse output terminal of the pulse generator 801. Switches 802a are equipped with continuity contacts which are normally connected to ground except during the pulsing interval. The pulse generator 801 may comprise a multivibrator, or any of the well known prior art circuits adapted to produce substantially square-topped pulses. The electrodes 805 attached to the ferroelectric units 803 are connected together and to a common output circuit which includes the $10^5$ ohm resistance element 806, the lower terminal of which is connected to ground. A condenser 813 of 0.01 microfarad is connected between the common lead to electrodes 805 and the input of the amplifier 814. As in the previously described circuit of Fig. 7A, the output of the amplifier 814 is controlled by the clamp circuit 815 in such a manner that no signal appears at terminal 850, when the clamp is operated by pulses from the source 801, these pulses being synchronized with the storage pulses.

The light source 810 may take the form of a tungsten projection lamp of the type previously described, filtered to remove radiation of wavelengths shorter than 4400 Angstroms. This is housed in a rotating cylinder having an aperture and lens or mirror system so focused, that when the cylindrical housing is rotated, the beam from the source 810 successively scans each of the ferroelectric elements 803. The drive for the scanning means of the source 810 is connected to ground through the switch 812, which also controls the operation of the energizer and pulse source 811 by application of energizing source 819. This latter circuit, which serves to pulse-modulate the scanning beam emitted from the source 810, may take any of the forms well known in the art, as indicated with reference to element 711 of circuit of Fig. 7A described in the foregoing paragraphs. It will be apparent that the same criteria may be applied in computing the intensity of the beam, its relative distance from the scanning elements and the focusing means employed, as described in detail with reference to Fig. 7A.

For the storage operation, the switch 802b is positioned to store pulses of a desired polarity on the elements 803. Information is then stored by depressing whichever of the buttons 802a are needed to produce the desired polarization pattern and closing key 809. The switch 802b is then disconnected from the storage pulse source 801. For read-out at any subsequent time the switch 812 is positioned to initiate operation of the scanning drive, and also the energizing and pulse source 811 connected to light source 810. The beam from the source 810 is then rotated so as to sweep each of the elements 803 in succession, thereby producing at the output terminal a succession of pulses which correspond to the pattern of signals initially stored on the elements 803. It will be apparent that since the read-out operation does not destroy the stored signal, this process may be repeated as many times as desired before a new pattern of polarization is impressed on the elements 803.

In addition to systems of the type just described, in which the scanning beam moves with substantially only one degree of freedom, as indicated in Fig. 8 of the drawings, numerous other types of systems can be devised in accordance with the teachings of the present invention, in which the scanning beam is moved in at least two dimensions. Such a system is indicated in Fig. 9 of the drawings, wherein a high voltage electron beam is utilized to scan a two-dimensional matrix of ferroelectric elements. For reasons of exposition, the size of the storage matrix has been greatly exaggerated in the drawing.

Referring in detail to Fig. 9, the matrix 900, including a plurality of ferroelectric storage elements, is supported at the large end of the evacuated cathode ray tube 920, the major surfaces of the matrix being substantially normal to the longitudinal axis of the tube. The matrix 900 may comprise a single crystalline element 903, which has dimensions of, say, 2 centimeters on an edge, and a thickness of about $2 \times 10^{-3}$ centimeters. The latter has evaporated on its outside surface, facing away from the beam source, an opaque platinum electrode 905. On the face of crystal element 903, facing the beam source, are mounted a plurality of bit electrodes 904, each about 1 millimeter square. These are mounted in rectangular array, successive electrodes being separated by about 3 millimeters. The whole arrary mechanically supported on an insulating backing element 907.

As pointed out with reference to the earlier figures, the crystal plate 903 may comprise a single crystalline element of barium titanate processed in a manner described in detail in application Serial No. 344,373 by J. P. Remeika; or alternatively it may comprise single crystals of guanidinum aluminum sulphate hexahydrate prepared in the manner described in application Serial No. 489,193 by B. T. Matthias. Another alternative form which crystalline element 903 may assume, is a thin film of barium titanate which has been evaporated onto a substrate of platium or palladium, in the manner described in application Serial No. 479,208, filed by W. P. Mason and R. N. Thurston, December 31, 1954.

Each of the electrodes 904 is connected to an individual pulsing switch 902a. Switch 902a is arranged with continuity contacts to supply ground contacts to the respective matrix elements at all times except during the pulsing interval. Terminals of each of the switches 902a are commonly connected through the armature of the switch 902b, which affords connection alternatively to the positive or negative terminals of the pulse source 901. As previously discussed, the pulse source 901 may comprise, for example, a multivibrator or any of the types of the circuits well known in the art, adapted to provide either positive or negative pulses for storage in the elements of matrix 900.

The common backing electrode 905 of the crystal element 903 is connected to an output circuit which comprises the $10^5$ ohm resistance element 906 to ground, and the 0.01 microfarad condenser 913. The latter is connected to the input terminals of the amplifier 914, the output of which is connected to terminal 950 and controlled by the clamping circuit 915. As previously discussed, clamping circuit 915 operates under control of the pulse source 901 to ground the output of the amplifier during the pulsing interval.

In the present embodiment, the matrix 900 is scanned by a high energy electron beam 925 which induces a pyroelectric current in each of the contacted ferroelectric elements 903, in the same manner that such a current is induced by a beam of infra-red radiant energy described with reference to the previous embodiments. It is necessary that the beam 925 have sufficient energy to generate a sufficient pyroelectric current in the elements of matrix 900. In the disclosed embodiment, for example, the beam moves through a potential drop of about 2000 volts, and has an intensity of, say, 100 microamperes. The beam should be sufficiently defined by electron focusing means, that it covers a spot about 1 millimeter in diameter, on the matrix 900. The electron gun 920 for generating the beam is of a conventional type, having a thermionic filament 924, a negatively biased control grid 921, and a group of positively biased focusing electrodes 922, in any of the usual arrangements, such as described, for example, in Chapter 5 of "Ultra High Frequency Techniques" by Brainer, Koehler, Reich, Woodruff, published by D. Van Nostrand Company, Inc., 1942. The beam 925 is constrained to scan the matrix 900 in a series of either horizontal or vertical scanning lines touching the elements in ordered succession. The path of beam 925 is controlled by horizontal and vertical deflecting plates 923 connected to the sweep circuit 926, which is of the form well known in the television art, such as described, for example, in the above-cited reference. The electron filament 924 of the electron gun is connected through switch 927, which also grounds sweep circuit 926, to the pulse-modulating and energizing source 911. The latter may take the form of any well known electrical pulse sources, such as a multivibrator. The length of the modulating pulses may be chosen as convenient, for example, within the range $10^{-1}$ to $10^{-6}$ seconds.

In operation, the desired polarization pattern is first impress on the matrix 900 by placing the switch 902b in the position of the desired polarity, and depressing the keys 902a in a preselected pattern. When this process has been completed, the switch 902b is disconnected. The recorded signals are then read out by depressing the double switch 927, which energizes the electron gun 920, the pulse-modulating source 911, and also the sweep circuit 926, initiating the scanning operation. The pyroelectric currents generated in the matrix 900 are then collected at the terminal 950 indicating the pattern of the stored pulses. It will be apparent that the pulse output from terminal 950 may be utilized to operate any one of numerous different types of recording and indicating devices well known in the art.

It will also be apparent from the foregoing discussion, that a device based on the generation of pyroelectric current in polarized ferroelectric crystal elements can be readily calibrated to measure the intensity of infrared radiation and also rapid changes in the temperature.

Figure 10:
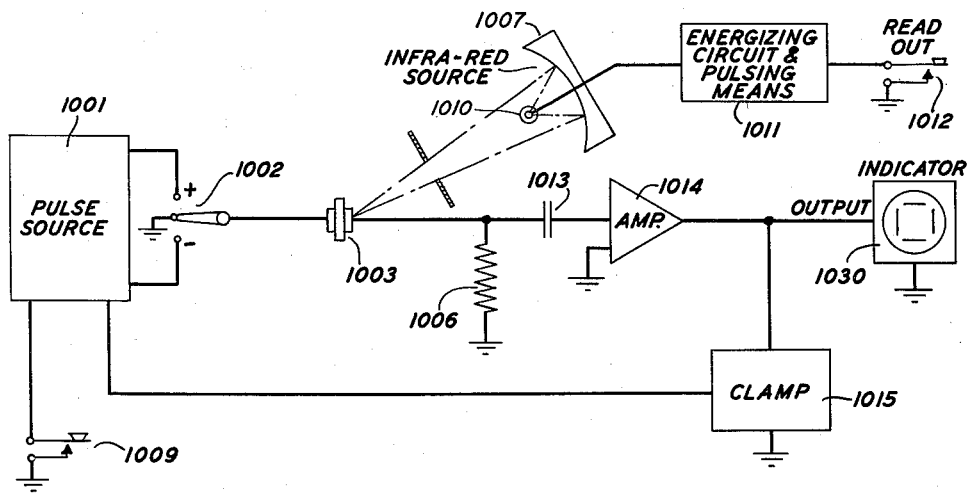
Fig. 10 shows the modification of the circuit disclosed in Figs. 7A and 7B to serve as an infra-red radiation detector.

A unit suitable for the measurement of intensity variations in infra-red radiation is shown in Fig. 10 of the drawings. It will be seen that this unit is substantially similar, in most respects, to the single element storage unit discussed with reference to Fig. 7A and 7B of the drawings, corresponding 700 series elements being similarly numbered, in the 1000 series. The same type of mechanism, as in the latter circuit, is employed for polarizing the ferrolelectric crystal unit 1003, and flashing a beam from source 1010 on the polarized unit for the purpose of generating pyroelectric currents therein. In the presently described circuit, however, the current output from the ferroelectric element 1003 is connected through the amplifier to energize a calibrated current-indicating device 1030. This may take the form of a simple current responsive circuit adapted to measure the instantaneous value of the amplified output pyroelectric current, which is a substantially linear function of the radiation input from the infra-red source 1010. Such a current indicator may be initially calibrated by using, in place of the light source 710, of Fig. 7A, one or more sources of known intensity of radiation consisting of wavelengths longer than about 4400 Angstroms. The source whose intensity is to be measured, 1010, is then merely substituted for the calibrating unit, and the respective readings on the output current indicator 1030, compared.

Alternatively, the indicator 1030 may take the form of a current integrating device, the integral of the pyroelectric current over a short time interval then being a roughly linear function of the temperature change of the crystal within that interval, as shown by the following:

In particular, if the crystal circuit is arranged to integrate the pyroelectric signal, the voltage pulse recorded is $\Delta V = \Delta Q/C$, where C is the capacity of the crystal, and $\Delta Q$ is the total change in polarization brought about by a rapid temperature change T. Then $$\Delta Q = A\left(\frac{dP_s}{dT}\right)_T \cdot \Delta T \qquad (7)$$

Now $$C = \frac{kA}{4\pi d} \times 10^{-12} \text{ farad}$$

where $A$=the active surface area, $d$=the thickness, and $k$ is the dielectric constant of the crystal. Thus $$\frac{\Delta V}{\Delta T} = \frac{4\pi d}{k}\left(\frac{dP_s}{dT}\right)_T \times 10^{12} \text{ volts/degree centigrade.} \qquad (8)$$

If $k$ is made equal to 160 (as for barium titanate), $\Delta V/\Delta T$ is about 15 volts per degree centigrade at 30° centigrade. Using wide band amplifiers, a signal of $10^{-4}$ volts can be detected very readily, which corresponds to a rapid temperature change of the order of $10^{-5}$ degree centigrade. At 100 degrees centigrade, a change of smaller than $10^{-6}$ degrees centigrade can be easily detected.

A suitable circuit for detecting such a small temperature change may take the form of a condenser-resistance circuit having the desired time constant. As indicated above, a temperature change of as little as $10^{-6}$ degrees centigrade can be detected easily in this manner.

Within the scope of the present invention, numerous modifications and variations of the disclosed circuits will occur to those skilled in the art. The principles herein set forth will be seen to be particularly applicable to reading out stored information in ferroelectric storage systems of the types disclosed by J. R. Anderson in applications Serial Nos. 254,245 and 261,665, filed November 1, 1951 and December 14, 1951, now Patents 2,717,372 and 2,717,373, respectively, both issued September 6, 1955.

Although single crystals of barium titanate, and alternatively of guanidinium aluminum sulphate hexahydrate, have been mentioned by way of example, as specific components of the disclosed circuits, it will be apparent that the principles of the invention can be applied to any other ferroelectric materials having the requisite hysteresis characteristics.

Various mechanical and electrical expendients have been described for carrying out the operations involved in storing the pulse, pulse-modulating the scanning beams, and scanning the array of ferroelectric storage elements. Since all of these operations are old and well known, many variations of the means specifically shown will readily occur to those skilled in the art.

Moreover, although by way of illustration, the irradiating beam has been alternatively described as comprising light, infra-red radiation, or electrons, it will be apparent that, within the scope of the present invention, any type of radiation which brings about sufficient temperature change within the crystal lattice thereof to induce a measurable flow of pyroelectric current may be employed for detecting the condition of polarization of a ferroelectric crystal element.

What is claimed is:

1. Means for non-destructively reading out an information bit, said bit being stored as remanent polarization in a particular direction in a ferroelectric element, said means comprising a pair of electrodes coupled to opposing surfaces of said element, an output circuit including current direction indicating means, means for briefly directing a high energy beam of radiation to impinge upon said element to rapidly change the temperature of said element, thereby generating pyroelectric current in said element, and a continuous electrical path consisting of leads connected to said electrodes and said output circuit.

2. An electrical storage device comprising in combination a ferroelectric crystalline element, means comprising a pair of electrodes coupled to opposing faces of said element, a potential source connectable to said electrodes for applying to said element a potential of sufficient magnitude to leave in said element a remanent polarization which corresponds to the polarity of said applied potential, means operative subsequently to the application of said potential to said element for detecting said remanent polarization, said last-named means comprising a source of a beam of radiation directed on said element, means for sufficiently varying the intensity of said beam impinging on a portion of said element to rapidly change the temperature of said portion, thereby causing the generation of substantial pyroelectric current in said element, wherein said pyroelectric current is a function of said remanent polarization, means comprising an output circuit for utilizing the said pyroelectric current generated in said element, and a continuous electrical path consisting of leads connected to said electrodes and said output circuit.

3. An electrical device comprising in combination a ferroelectric crystal element characterized by a substantially rectangular hysteresis loop, means comprising a pair of electrodes coupled to opposing faces of said element, a first means for storing signal information in said element, said means comprising a potential source connectable to said electrodes for applying a pulse of sufficient magnitude and appropriate sign to change the remanent polarization of said element from one point to another point on said hysteresis loop, a second means operative subsequently to said first means for detecting the sign of the remanent polarization in said element, said second means comprising a source of a beam of radiation directed to briefly impinge on a spot on said element with sufficient energy to rapidly alter the temperature of said spot, thereby causing the generation of pyroelectric current in said element, said pyroelectric current being a function of the remanent polarization of said element, an output circuit for utilizing said pyroelectric current generated in said element, and a continuous electrical path consisting of leads connected to said electrodes and said output circuit.

4. An electrical storage device comprising in combination a ferroelectric crystal element, means comprising a pair of electrodes coupled to opposing faces of said element, a first means for storing signal information in said element, said means comprising a pulse source connected to said electrodes for applying a pulse to said element of sufficient magnitude and appropriate sign to produce a remanent polarization therein which corresponds to the polarity of said applied pulse, a second means operative subsequently to said first means for reading out the information stored as said remanent polarization, said second means comprising means for generating a beam of electromagnetic radiation restricted to wavelengths in excess of about 4,400 angstroms, means operative under control of a source of read-out pulses for briefly focusing said beam on a portion of said element with sufficient energy to cause a rapid variation of the temperature of said portion thereby to generate substantial pyroelectric current pulses in said element, said pyroelectric current pulses being a function of said remanent polarization, an output circuit for utilizing said pyroelectric current pulses, and a continuous electrical path consisting of leads connected to said electrodes and said output circuit.

5. An electrical storage device comprising in combination a ferroelectric crystal element, characterized by a substantially rectangular hysteresis characteristic, means comprising electrodes coupled to opposing faces of said element, a first means for storing signal information in said element, said means comprising a pulse source connected to said electrodes for applying a pulse of sufficient magnitude and appropriate sign to produce a remanent polarization in said element which corresponds to the polarity of said applied pulse, a second means operative subsequently to said first means for reading out the information stored as remanent polarization in said element, without substantially altering the condition of polarization of said element, said second means comprising a source of a beam of radiation substantially restricted to wavelengths in excess of 4,400 angstroms, means operative under control of read-out pulses for briefly focusing said beam on a portion of said element with sufficient intensity to rapidly alter the temperature of said portion, thereby to generate pyroelectric current pulses, the magnitude and polarity of said pyroelectric current pulses being a function of the remanent polarization in said element, an output circuit for utilizing said pyroelectric current pulses, and a continuous electrical path consisting of leads connected to said electrodes and said output circuit.

6. A ferroelectric storage system comprising in combination an ordered array of ferroelectric crystalline elements, electrodes connected to opposing faces of each of said elements, means comprising a source of electrical potential pulses connectable through respective ones of said electrodes to each of said elements individually in a preselected order to establish in the elements of said array a preselected pattern of remanent polarizations, which correspond in sign and distribution to the arrangement of the potential pulses applied by said potential source, a second means operative subsequently to said first means for reading out the information stored as remanent polarizations in said elements, said means comprising a source of a beam of electromagnetic radiation restricted to wave-lengths in excess of about 4,400 Angstroms and directed to briefly impinge on a spot on each of said elements with sufficient energy to rapidly alter the temperature of said spot, thereby causing the generation of pyroelectric current in said element, the magnitude and polarity of said pyroelectric current being a function of the remanent polarization of said element, scanning means coupled to said source to direct said beam to individually scan said elements in a preselected order, means coupled to said beam source for modulating said beam, means comprising an output circuit for utilizing the pyroelectric current pulses generated in said elements by said beam, and a continuous electrical path consisting of leads connected to said electrodes and said output circuit.

7. An electrical storage device comprising in combination a matrix of ferroelectric crystalline elements, electrode means respectively coupled to opposing surfaces of said elements, information storage means comprising a potential source connectable through said electrode means to said elements individually to establish in the elements of said matrix a preselected pattern of remanent polarizations which correspond in sign and distribution to the arrangement of pulses applied by said potential source, means operative subsequently to said information storage means for reading out information stored as remanent polarization in the elements of said matrix, said means comprising a source of a high energy electron beam directed to briefly impinge on a spot on each of the elements of said matrix with sufficient energy to rapidly alter the temperature of said spot, thereby causing the generation in said element of a pyroelectric current, said pyroelectric current being a function of the remanent polarization of said element, means connected to said source for modulating said beam in a series of pulses, scanning means for directing said beam to scan the elements of said matrix in a preselected order, an output circuit for receiving the pyroelectric currents generated by said beam, and a continuous electrical path consisting of leads connected to said electrodes and said output circuit.

8. A device for detecting and measuring the intensity of a test source of infra-red radiation which comprises in combination a ferroelectric crystalline element, electrode means coupled to opposing surfaces of said element, means for remanently polarizing said element in a given direction of polarization, means for focusing the radiation of said test source on said ferroelectric crystalline element, means for pulse modulating the radiation of said test source, and means connected to said electrode means for collecting the pyroelectric current generated in said element by the radiation from said test source, and indicating means connected to said collecting means for indicating the magnitude of the pyroelectric current generated in said element by the radiation of said test source.

9. An electrical storage device comprising in combination a monomorphic ferroelectric crystalline element, means comprising a pair of electrodes coupled to opposing faces of said element, a potential source connectable to said electrodes for applying to said element a potential of sufficient magnitude to leave in said element a remanent polarization which corresponds to the polarity of said applied potential, means operative subsequently to the application of said potential to said element for detecting said remanent polarization, said last-named means comprising a source of a beam of radiation directed on said element, means for sufficiently varying the intensity of said beam impinging on a portion of said element to rapidly change the temperature of said portion, thereby causing the generation of substantial pyroelectric current in said element, wherein said pyroelectric current is a function of said remanent polarization, means comprising an output circuit for utilizing the said pyroelectric current generated in said element, and a continuous electrical path consisting of leads connected to said electrodes and said output circuit.

10. An electrical device comprising in combination a monomorphic element consisting of a ferroelectric single crystal characterized by a substantially rectangular hysteresis loop, means comprising a pair of electrodes coupled to opposing faces of said element, a first means for storing signal information in said element, said means comprising a potential source connectable to said electrodes for applying a pulse of sufficient magnitude and appropriate sign to change the remanent polarization of said element from one point to another point on said hysteresis loop, a second means operative subsequently to said first means for detecting the sign of the remanent polarization in said element, said second means comprising a source of a beam of radiation directed to briefly impinge on a spot on said element with sufficient energy to rapidly alter the temperature of said spot, thereby causing the generation of pyroelectric current in said element, said pyroelectric current being a function of the remanent polarization of said element, an output circuit for utilizing said pyroelectric current generated in said element, and a continuous electrical path consisting of leads connected to said electrodes and said output circuit.

11. An electrical storage device comprising, in combination, a monomorphic element consisting of a ferroelectric single crystal wafer having a thickness dimension which is small compared to the cross-sectional dimensions of the major faces of said wafer, said wafer being oriented with its optic axis in said thickness direction, means comprising a pair of electrodes coupled to the opposite major faces of said element, a first means for storing signal information in said element, said means comprising a pulse source connected to said electrodes for applying a pulse to said element of sufficient magnitude and appropriate sign to produce a remanent polarization therein which corresponds to the polarity of said applied pulse, a second means operative subsequently to said first means for reading out the information stored as said remanent polarization, said second means comprising means for generating a beam of electromagnetic radiation restricted to wavelengths in excess of about 4,400 angstroms, means operative under control of a source of read-out pulses for briefly focusing said beam on a portion of said element with sufficient energy to cause a rapid variation in the temperature of said portion thereby to generate substantial pyroelectric current pulses in said element, said pyroelectric current pulses being a function of said remanent polarization, an output circuit for utilizing said pyroelectric current pulses, and a continuous electrical path consisting of leads connected to said electrodes and said output circuit.

12. An electrical storage device comprising in combination a monomorphic element consisting of a single crystal wafer of barium titanate, characterized by a substantially rectangular hysteresis characteristic, means comprising electrodes coupled to opposite faces of said element, a first means for storing signal information in said element, said means comprising a pulse source connected to said electrodes for applying a pulse of sufficient magnitude and appropriate sign to produce a remanent polarization in said element which corresponds to the polarity of said applied pulse, a second means operative subsequently to said first means for reading out the information stored as remanent polarization in said element, without substantially altering the condition of polarization of said element, said second means comprising a source of a beam of radiation substantially restricted to wavelengths in excess of 4,400 angstroms, means operative under control of a read-out pulse for briefly focusing said beam on a portion of said element with sufficient intensity to rapidly alter the temperature of said portion, thereby to generate a pyroelectric current pulse, the magnitude and polarity of said pyroelectric current pulse being a function of the remanent polarization in said element, an output circuit for utilizing said pyroelectric current pulse, and a continuous electrical path consisting of leads connected to said electrodes and said output circuit.

13. A device for detecting and measuring the intensity of a test source of infra-red radiation which comprises in combination a remanently polarized ferroelectric crystalline element, electrode means coupled to opposing surfaces of said element, means for impinging the radiation of said test source on said ferroelectric crystalline element, means comprising an output circuit for measuring the pyroelectric current generated in said element by the radiation from said test source, and a continuous electrical path consisting of leads connected to said electrodes and said output circuit.

14. A device for detecting and measuring variations in temperature which comprises in combination a remanently polarized ferroelectric element, the temperature of which varies in accordance with said temperature variations, electrode means coupled to opposing surfaces of said element, means comprising an output circuit for measuring the pyroelectric current generated in said element as a result of said temperature variations, and a continuous electric path consisting of leads connected to said electrodes and said output circuit.

References Cited in the file of this patent

UNITED STATES PATENTS

| | | |
|---|---|---|
| 2,648,983 | Lamb | Aug. 18, 1953 |
| 2,695,396 | Anderson | Nov. 23, 1954 |
| 2,709,367 | Bohnet | May 31, 1955 |
| 2,742,631 | Rajchman et al. | Apr. 17, 1956 |
| 2,743,430 | Schultz et al. | Apr. 24, 1956 |
| 2,793,288 | Pulvari | May 21, 1957 |